(12) United States Patent
Schmidt

(10) Patent No.: US 7,086,522 B2
(45) Date of Patent: Aug. 8, 2006

(54) DEVICE FOR VIBRATORY INDEXING OF PORTIONED PIECES

(76) Inventor: Norman Schmidt, 2187 Rietta Court, Burnaby, BC (CA) V3J 7J7

( * ) Notice: Subject to any disclaimer, the term of this patent is extended or adjusted under 35 U.S.C. 154(b) by 214 days.

(21) Appl. No.: 10/231,170

(22) Filed: Aug. 30, 2002

(65) Prior Publication Data

US 2003/0041746 A1  Mar. 6, 2003

Related U.S. Application Data

(60) Provisional application No. 60/316,955, filed on Sep. 5, 2001, provisional application No. 60/376,326, filed on Apr. 26, 2002.

(51) Int. Cl.
*B65G 27/06* (2006.01)
(52) U.S. Cl. .................. 198/758; 198/752.1; 198/459.6
(58) Field of Classification Search ............. 198/459.1, 198/459.6, 462.1, 533, 534, 523, 752.1, 750.8, 198/758
See application file for complete search history.

(56) References Cited

U.S. PATENT DOCUMENTS

| | | | | |
|---|---|---|---|---|
| 339,656 A * | 4/1886 | Jackson | .................. | 414/798.8 |
| 1,588,085 A * | 6/1926 | Atticks | ..................... | 198/461.3 |
| 1,899,893 A * | 2/1933 | Cadwallader, Jr. | .......... | 198/758 |
| 2,144,048 A * | 1/1939 | Cadwallader, Jr. | .......... | 198/758 |
| 3,883,283 A * | 5/1975 | Herrera | ...................... | 425/337 |
| 4,114,752 A * | 9/1978 | Schiek | .................. | 198/341.02 |
| 4,945,825 A * | 8/1990 | Florindez | ...................... | 99/353 |
| 4,972,970 A * | 11/1990 | Toerner | ......................... | 222/1 |
| 5,817,361 A * | 10/1998 | Campbell et al. | ........... | 426/496 |
| 6,065,390 A * | 5/2000 | Florindez | ...................... | 99/334 |
| 6,276,516 B1 * | 8/2001 | Bagust et al. | ............... | 198/530 |
| 6,457,610 B1 * | 10/2002 | Marti-Sala | ............... | 222/185.1 |
| 6,726,002 B1 * | 4/2004 | van Wijngaarden et al. | ...... | 198/614 |

* cited by examiner

*Primary Examiner*—James R. Bidwell

(57) ABSTRACT

A portioned piece spacing apparatus having at least one contoured chute. The contoured chute having at least one angle of declination, a receiving area and an discharge tip. The at least one vibrating chute being coupled to a vibrating mechanism through an at least one resilient member supporting the at least one contoured chute, wherein the vibrating mechanism vibrates the chute such that the portioned piece moves upward and forward relative to the at least one contoured chutes and the portioned pieces are held on the contoured chute and allowed to accumulate in a spaced manner at a discharge end of the contoured chute.

37 Claims, 12 Drawing Sheets

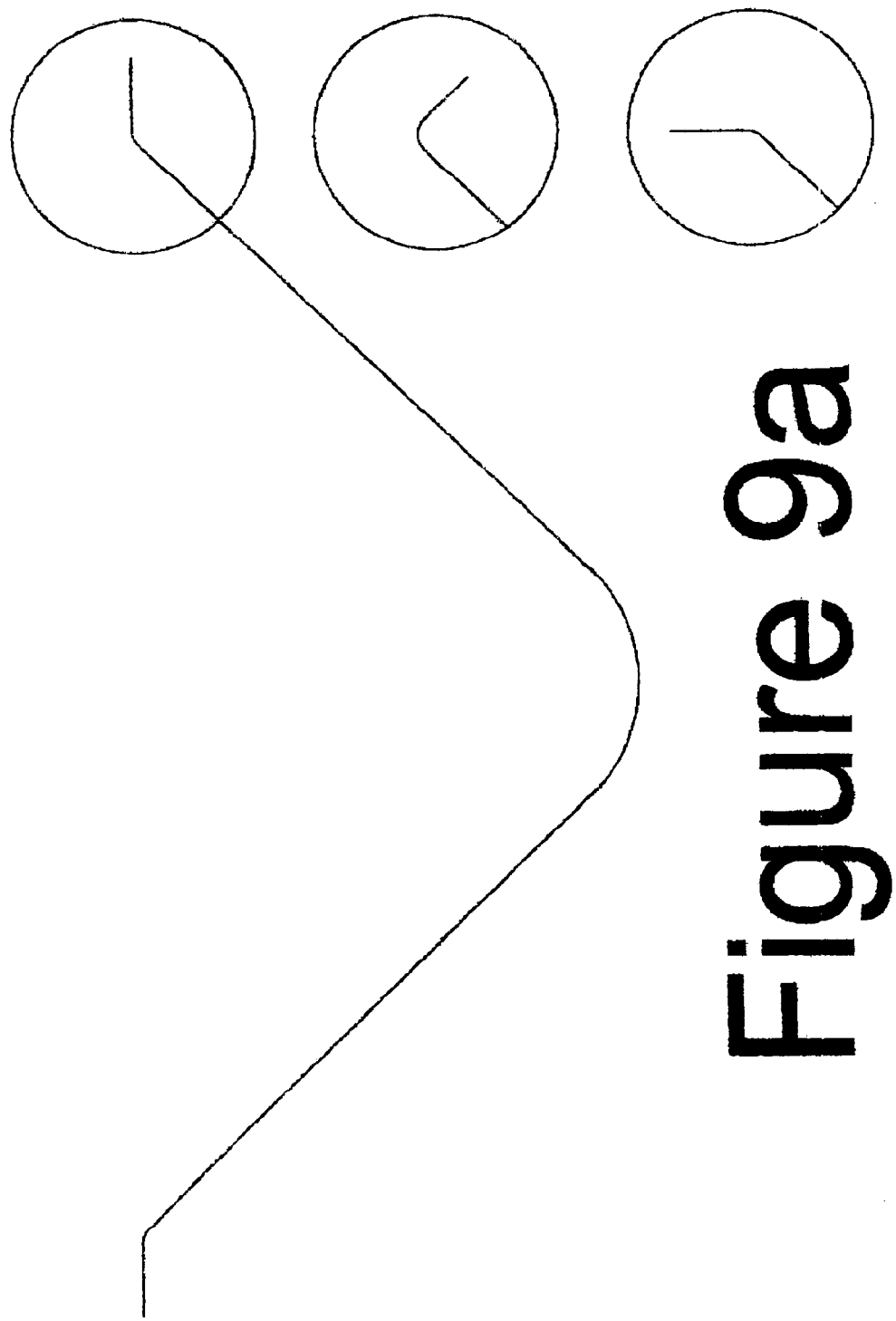

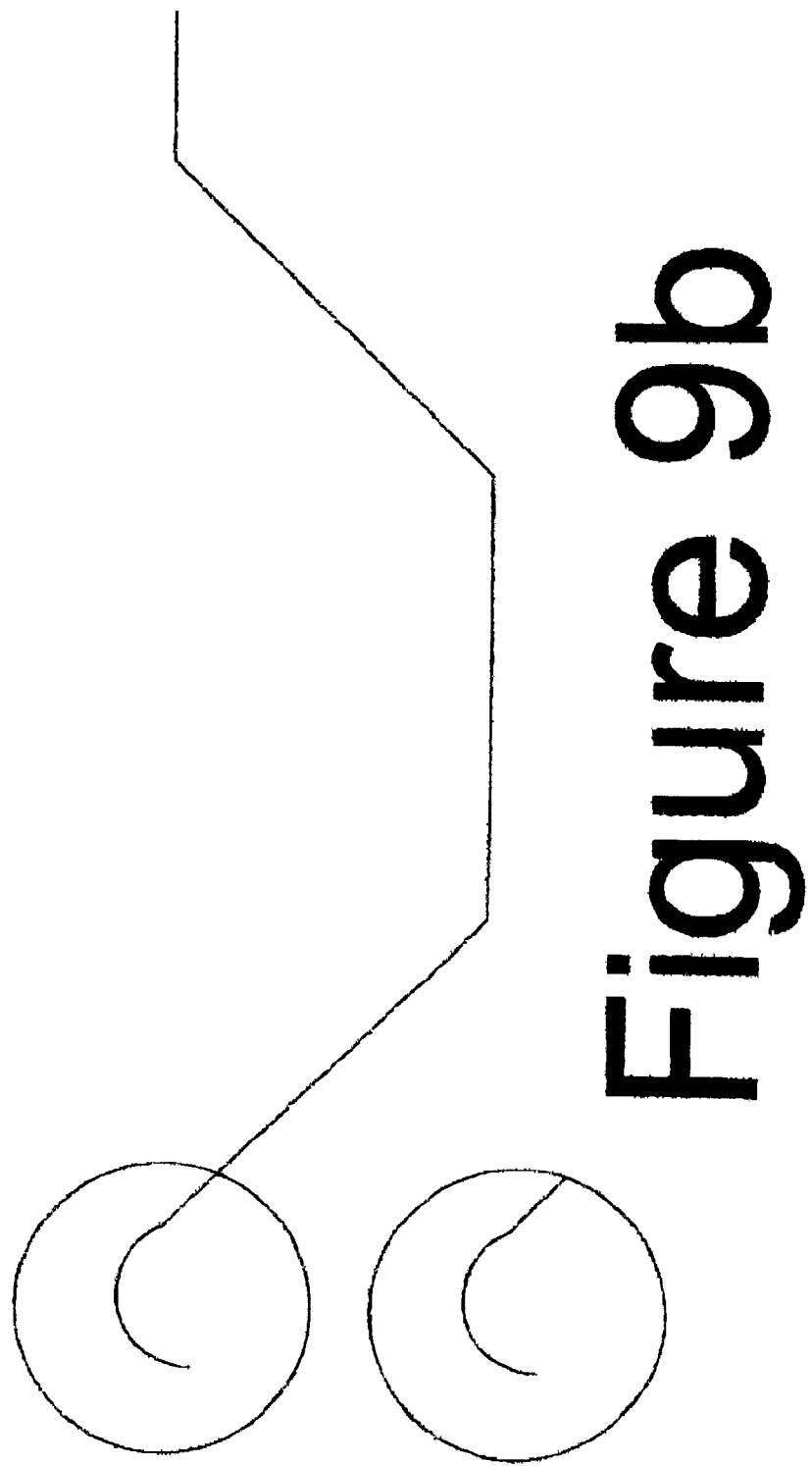

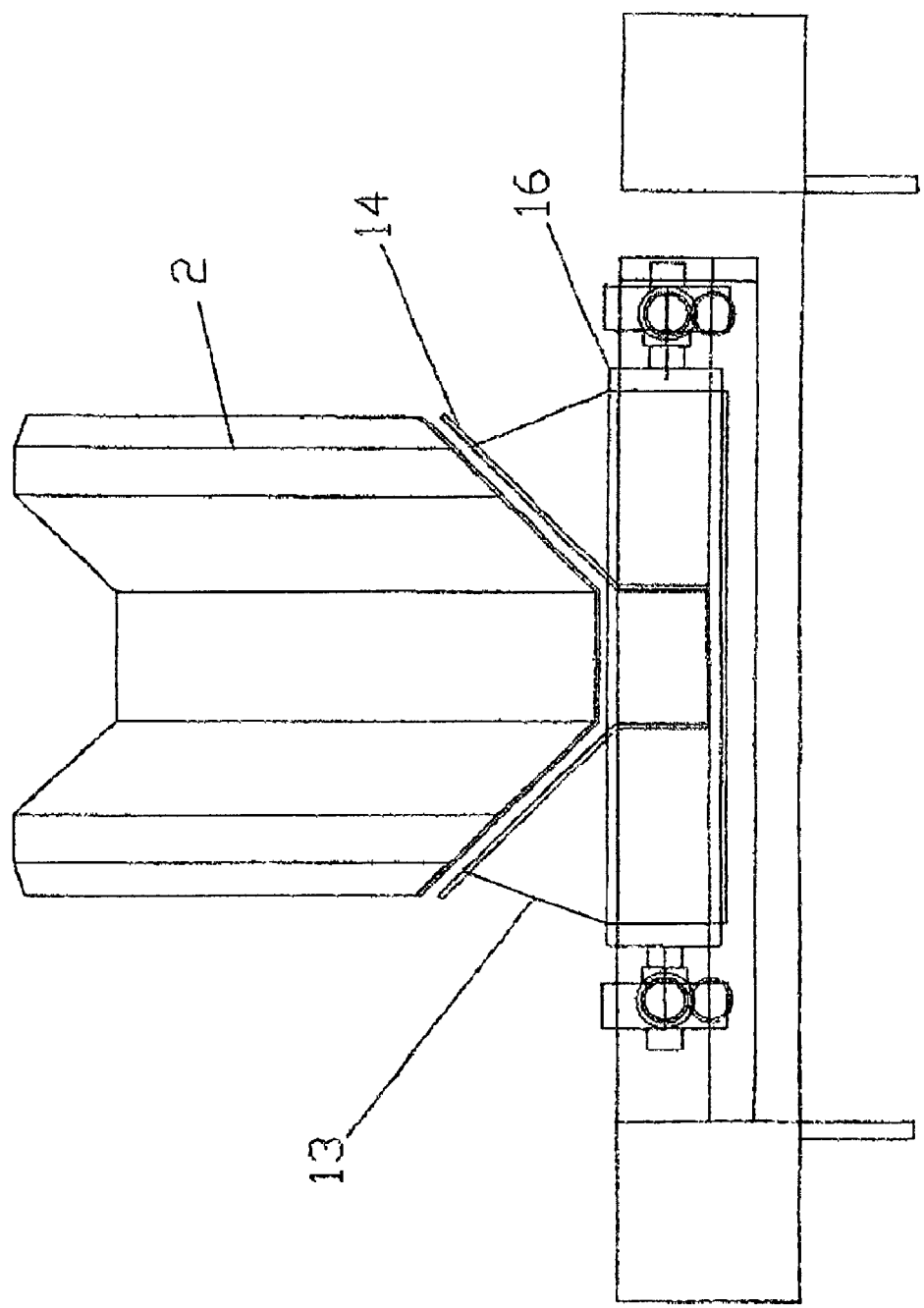

DEVICE FOR VIBRATORY INDEXING OF PORTIONED PIECES

CROSS REFERENCE To RELATED APPLICATIONS

This application claims benefit of the earlier filed U.S. Provisional Applications Nos. 60/316955 filed Sep. 5, 2001 and 60/376326 filed Apr. 26, 2002, respectively, which are incorporated herein by reference.

BACKGROUND OF THE INVENTION

In industries engaged in producing baked food products such as bread and pizza, there is a need to systematically or uniformly feed processing machinery with portioned product. These portioned products may be for example, but are not limited to, bread dough pieces or pizza dough pieces to be processed into finished product or loaded into containers for shipment. Portioned product are typically products that are accurately scaled or volumetrically cut into pieces. Some non-limiting examples of types of products that are portioned products include pizza dough, bread dough, pie base dough and bagel dough. The pieces are typically mixed in bulk and cut or dispensed from the bulk mix.

To facilitate the further processing or loading of these portioned pieces they must be fed in a stream of product into the processing or loading machinery in a uniform or systematic manner. The stream of portioned products can become improperly sequenced due to a myriad of different causes. The portioned pieces in the stream will often come from the portioning or scaling machines that measure the portioned pieces. These machines often do not produce the portioned materials at a constant rate. In some cases as these pieces are transported or conveyed, they may lose the proper timing, spacing or sequencing. A specific, non-limiting example of this can occur in the case of bread and pizza dough, where these portioned pieces may lose their sequence due to a processing step where the portioned pieces are rounded into a rough spherical shape. Similarly, the portioned pieces of dough often need to be flour coated to nullify their tackiness and this can affect spacing. During these rounding and/or flour coating operations, the portioned pieces often lose their sequence or space timing.

If this condition is not corrected, the portioned pieces may cause difficulties during downstream manufacturing processes. In some instances, with some pieces being too close together, they can drop into the next processing machine as a "double piece", thereby causing a jam and a loss of product from the jam and the lag in the shut down of the line. In addition to increased delays in production and downtime of the line, the possibility of jams during production increases labor costs in man hours to achieve production targets and to clear the line.

Commercially available machines have worked at solving this problem by having the portioned pieces drop onto a horizontal roller conveyor where all rollers would be rotating in the same direction but each roller would have a decreased rotational velocity from the previous roller. The roller conveyor would receive portioned pieces at the higher speed end and have the portioned piece travel to the slowest end where it would drop from the conveyor as it passes over the last roller. The portioned pieces that drop onto this series of rollers would move forward and come in intimate contact with the already slower moving earlier dropped pieces. However, when the portioned piece moves forward and contacts the back of an earlier portioned piece, it is not able to push the row of accumulating earlier portioned pieces forward and therefore it will slip on the rollers it is being supported on. As the row of portioned pieces come together and push each other forward they tend to cause the row of portioned pieces to move laterally or shingle sideways thereby possibly still causing a jam. The rollers of these prior art machines being of constant diameter will give no effect to alignment of the portioned pieces. Guides are used on the sides of this roller conveyor so as to contain the row and minimize shingling but must be kept wide enough to allow for passage of miss shaped or improperly formed portioned pieces. Thus the guides should be adjusted for each size of portioned piece being run, this adjustment is often overlooked. To minimize the pushing force of the row of portioned pieces the speed of the rollers is set so that the portioned pieces will only come into intimate contact as they approach the discharge point of the roller conveyor. This tends to minimize the accumulation effect of the roller conveyor.

Thus these machines have several flaws. The short comings of these machines is that they were only capable of affecting limited changes in the spacing of the portioned pieces and are not capable of stopping and holding pieces for indexing or synchronized feeding into subsequent machines. They were also built with a fixed width roller conveyor and manually adjustable side guides to accommodate different sized pieces. These portioned pieces would often change in size due to differences in final product size and weight and were not of a consistent shape. If the pieces were badly miss-shaped or if the guides were not properly adjusted, the pieces could become jammed or two portioned pieces could become wedged between the guides on the roller conveyor.

The commercially available machines also require a high degree of maintenance. The machines are often required to run in an extremely dusty flour environment. The rollers require a high degree of maintenance to keep the flour out of the bearings. A further maintenance difficulty arises from the complexity of the drive system used to slow or adjust the portioned piece spacing, which utilized gears and chains in order to produce the progressively decreasing roller speeds. With all of these gears and chains operating in a dusty flour environment the reliability of these machines is greatly reduced.

Thus a need exists for a portioned piece-dispensing machine for adjusting the spacing of the portioned pieces for indexing and synchronizing for further manipulation. Additionally, a need exists to lessen the required maintenance over commercially available portioned piece-dispensing machines.

BRIEF DESCRIPTION OF THE INVENTION

An object of the instant invention is to provide a portioned piece-dispensing machine that adjusts the spacing of the portioned pieces for indexing and synchronizing the line of portioned pieces.

A further object is to provide a portioned piece-dispensing machine that requires less maintenance than commercially available portioned piece-dispensing machines.

A still further object of the instant invention is to take portioned pieces and feed them in a uniform manner or rate to subsequent machines.

A still further object of the invention is to provide a device and method for receiving portioned pieces and putting them in a row, where this row alignment is maintained to the point of discharge.

Yet another object of the invention is it allows for sequential or synchronized feeding of portioned pieces.

Although vibratory conveyors and there design are common knowledge and are used extensively in the conveying and often in the metered conveying of materials, the instant invention is imparting this motion on portioned pieces of viscous or semi-viscous, tacky or coated materials that are not normally moved in this manner. The use of vibration coupled with the driving or moving force of the vibration has been used in processes that cause powders and light materials to flow to an even layer on the vibratory surface and move at an even rate. Still further examples are found for moving cereals and powders onto weighing heads. However, the use of vibratory motion to effect the spacing of portioned product, especially dough, has not been successfully implemented. Moreover, the ability to successfully accumulate and then uniformly discharge portioned pieces of this nature through the use of vibratory conveyors has not been previously proven. These aspects of the invention are achieved through a novel and useful combination of vibratory motion.

Some non-limiting examples of the beneficial uses of the instant invention would be where portioned pieces are fed to a machine, which would pack the portioned pieces into trays. When a full tray is removed or exchanged for an empty tray the feeding or placing of portioned pieces would have to be stopped. This feeding system would be sequential where a fixed number of pieces would be fed to the processing or packing machine then the feed would stop for a given amount of time and then restart. For this operation the invention is able to change the spacing of the streams of portioned pieces, where these pieces would have to be sequentially fed to a machine which would pack these portioned pieces into trays or packages. The instant invention is able to groups or places these portioned products that are to be fed in a sequential manner to match the loading rate of the loading machine. It may also hold the product for a period of time while a full tray or package is removed and replaced with an empty one.

The manner in which this accumulation and holding is achieved is one important aspect of the invention. An analogy can be drawn to the difference between an escalator, moving passengers mechanically at a steady set rate that can be varied, and a playground slide, utilizing gravity, where the slides gentle slope and curve moves the passengers into one another in a gentle, controlled manner also allowing for accumulation when no one gets off. Once the bottom person gets off in the slide example the remaining persons will slide down and again into place for the next person to get off. In contrast, the escalator must dump its passengers off on top of one another to as it continues to move. Thus, during the dwell or accumulation time period, the instant invention would accumulate and hold the portioned product and then resume systematic feeding of the portioned pieces into the loading machine.

The invention is directed to a portioned piece spacing apparatus, comprising an at least one contoured chute having at least one angle of declination relative to a horizontal plane upon which the apparatus is situated. The apparatus includes at least one vibrating mechanism coupled to the at least one contoured chute. The apparatus also has at least one resilient member supporting the at least one contoured chute. The vibrating mechanism vibrates the chute in an at least one direction relative to the horizontal of the apparatus such that the portioned pieces are supported on the contoured chute and allowed to decelerate in a sequenced manner at a discharge tip of the contoured chute.

In the spacing apparatus of claim the at least one angle of declination can be a series of declination angles formed by an at least one chute having a constant radius of curvature from a receiving area to a discharge tip.

In the spacing apparatus the at least on declination angle can comprise a single declination angle that is constant throughout the contoured chute and is between about −10 degrees and 80 degrees relative to the horizontal plane of the apparatus.

In the portioned piece spacing apparatus the deceleration of the portioned pieces in a sequenced manner is provided by a decreasing driving force transmitted from the vibrating mechanism through said at least one resilient member. In the portioned piece spacing apparatus the pieces that are supported on the contoured chute are allowed to accumulate in a spaced manner proximate to the discharge tip of the contoured chute.

The spacing apparatus can have the at least one contoured chute have a substantially v-shaped contour. The spacing apparatus can also have the at least one contoured chute with a substantially u-shaped contour. The spacing apparatus can have the at least one contoured chute with a contour comprising curved sides connected by a flat bottom. The spacing apparatus can also have the at least one contoured chute with a contour comprising sloped sides connected by a flat bottom.

In the spacing apparatus the at least one angle of declination can be a constantly decreasing angle of declination formed by an at least one chute having a decreasing radius of curvature. The spacing apparatus can also have the at least one angle of declination include a first angle of declination and a second angle of declination, the second angle of declination being lower than the first angle. In the spacing apparatus the decrease in angle from a first angle to a second angle of declination can be sufficient enough to reduce the speed of the portioned pieces moving from a receiving area of the contoured chute to the discharge tip of the contoured chute.

In the spacing apparatus of the first declination angle can be between about 0 degrees and about 45 degrees. The first declination angle can also be about 25 degrees.

The vibration of the contoured chute and the lower second angle of declination allows the portioned pieces to accumulate at the exit of the contoured chute in accurately spaced manner.

In the spacing apparatus the second declination angle can be between about −10 degrees and about 10 degrees. The second declination angle can also be about 0 degrees.

In the spacing apparatus the portioned pieces can drop from said discharge tip from said contoured chute onto a further processing device. The further processing device can be an indexing wheel. The further processing device can be a spacing conveyor.

In the spacing apparatus the at least one contoured chute can includes a first contoured chute coupled to a second contoured chute, the first chute having a first portioned piece receiving area and a second portion piece discharge tip and the second chute having a second portioned piece receiving area and a second portion piece discharge tip. The at least one declination angle can further comprise a first declination angle formed by said first contoured chute extending from said first receiving area toward said first discharge tip relative to the horizontal plane. The at least one declination angle can further comprise a second declination angle formed by said second contoured chute extending from said first receiving area toward said first discharge tip relative to the horizontal plane. In the spacing apparatus the second angle of declination is less than said first angle and said second chute accumulates portioned pieces.

Also in the spacing apparatus the portioned pieces can be vibrated in a substantially perpendicular direction relative to the chute to the at least one resilient member. The angle of declination can also vary about 20 degrees relative to the contoured chute between the receiving area and the discharge tip.

The instant invention includes another portioned piece spacing apparatus comprising an at least one contoured chute having at least one angle of declination, receiving area and a discharge tip with a vibrating mechanism coupled to the at least one contoured chute. The apparatus having at least one resilient member coupled at a resilient member angle to the at least one contoured chute and supporting the at least one contoured chute. In the apparatus the vibrating mechanism vibrates the at least one contoured chute vibrates in at least one direction relative to the horizontal of the apparatus and the portioned pieces are supported on the contoured chute and allowed to decelerate in a sequenced manner at a discharge tip of the contoured chute.

In the spacing apparatus the at least on delineation angle can comprises a single declination angle that is constant throughout the contoured chute and is between about –10 degrees and 80 degrees relative to the horizontal plane of the apparatus.

The portioned pieces can accumulate in a spaced manner proximate to a discharge tip of the contoured chute. In the portioned piece spacing apparatus the deceleration of the portioned pieces in a sequenced manner can be provided by decreasing the driving force transmitted from the vibrating mechanism through said at least one resilient member In the portioned piece spacing apparatus the pieces that are supported on the contoured chute can be allowed to accumulate in a spaced manner proximate to the discharge tip of the contoured chute.

In the spacing apparatus the at lest one resilient member coupled at a resilient member angle can comprise a first resilient member at a first resilient member angle. The first resilient member angle can be between about 0 and about 80 degrees. The first resilient member angle can also be between about 20 and about 45 degrees.

In the spacing apparatus the at lest one resilient member can comprise a second resilient member at a second resilient member angle. The second resilient member angle can be equal to the first resilient member angle. The second resilient member angle can be between about 10 and about 80 degrees. The second resilient member angle can also be between about 20 and about 45 degrees.

In the spacing apparatus the at lest one resilient member can comprise a third resilient member at a third resilient member angle. The third resilient member angle can be equal to the first resilient member angle. The third resilient member angle can be between about 10 and about 80 degrees. The third resilient member angle can be between about 20 and about 45 degrees.

In the spacing apparatus the portioned pieces can be dropped from said discharge tip of said contoured chute onto a further processing device. The further processing device can be an indexing wheel. The further processing device can be a spacing conveyor. The further processing device can be an indexing device.

In the spacing apparatus the at least one contoured chute can include a first contoured chute coupled to a second contoured chute, the first chute having a first portioned piece receiving area and a first portioned piece discharge tip and the second chute having a second portioned piece receiving area and a second portioned piece discharge tip. The first contoured chute can form a first angle relative to the horizontal plane of the apparatus from said first portioned piece receiving area to said first portioned piece discharge tip. The second contoured chute can form a second angle relative to the horizontal plane of the apparatus from said second portioned piece receiving area to said second portioned piece discharge tip. The second angle can be less than said first angle and said second contoured chute can accumulate portioned pieces.

The invention includes a method of indexing portioned product, comprising the method steps of: vibrating a contoured chute with a longitudinal axis, providing portioned pieces of product to an receiving area on said contoured chute, vibrating said product at an at least one angle so as to provide a movement vector comprised of at least one forward component relative to the chute. The method includes aligning said portioned pieces along said contoured chute and removing said portioned pieces in an indexed manner.

The method can further comprise the method step of varying the said at least one angle at which said portioned pieces are vibrated by changing an angle of a resilient member attached to said contoured chute.

The method can further comprise the method step of varying the said at least one angle at which said portioned pieces are vibrated by changing a declination angle of said contoured chute.

The method can further comprise the method step of varying the said at least one angle at which said portioned pieces are vibrated by changing an angle of a resilient member attached to said contoured chute and changing a declination angle of said contoured chute.

The invention also includes a still further portioned piece spacing apparatus, comprising an at least one contoured chute having a longitudinal center line, an at least one angle of declination, an receiving area and an discharge tip with a vibrating mechanism coupled to the at least one contoured chute. An at least one resilient member is included, supporting the at least one contoured chute. The vibrating mechanism vibrates the chute such that the portioned piece moves upward and forward relative to the longitudinal centerline of the at least one contoured chute and the portioned pieces are supported on the contoured chute and allowed to decelerate in a sequenced manner at a discharge tip of the contoured chute.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DESCRIPTION OF FIGURES

FIGS. 9A and 9B show exemplary contours for the contoured vibratory chutes of the exemplary embodiments depicted.

FIG. 10 shows a front view of the exemplary embodiment of FIG. 11, having a single piece continuous contoured chute with two angles of declination depositing onto the bottom spacing conveyor.

DETAILED DESCRIPTION OF THE FIGURES AND THE EXEMPLARY EMBODIMENTS OF THE INVENTION

Figure 1:
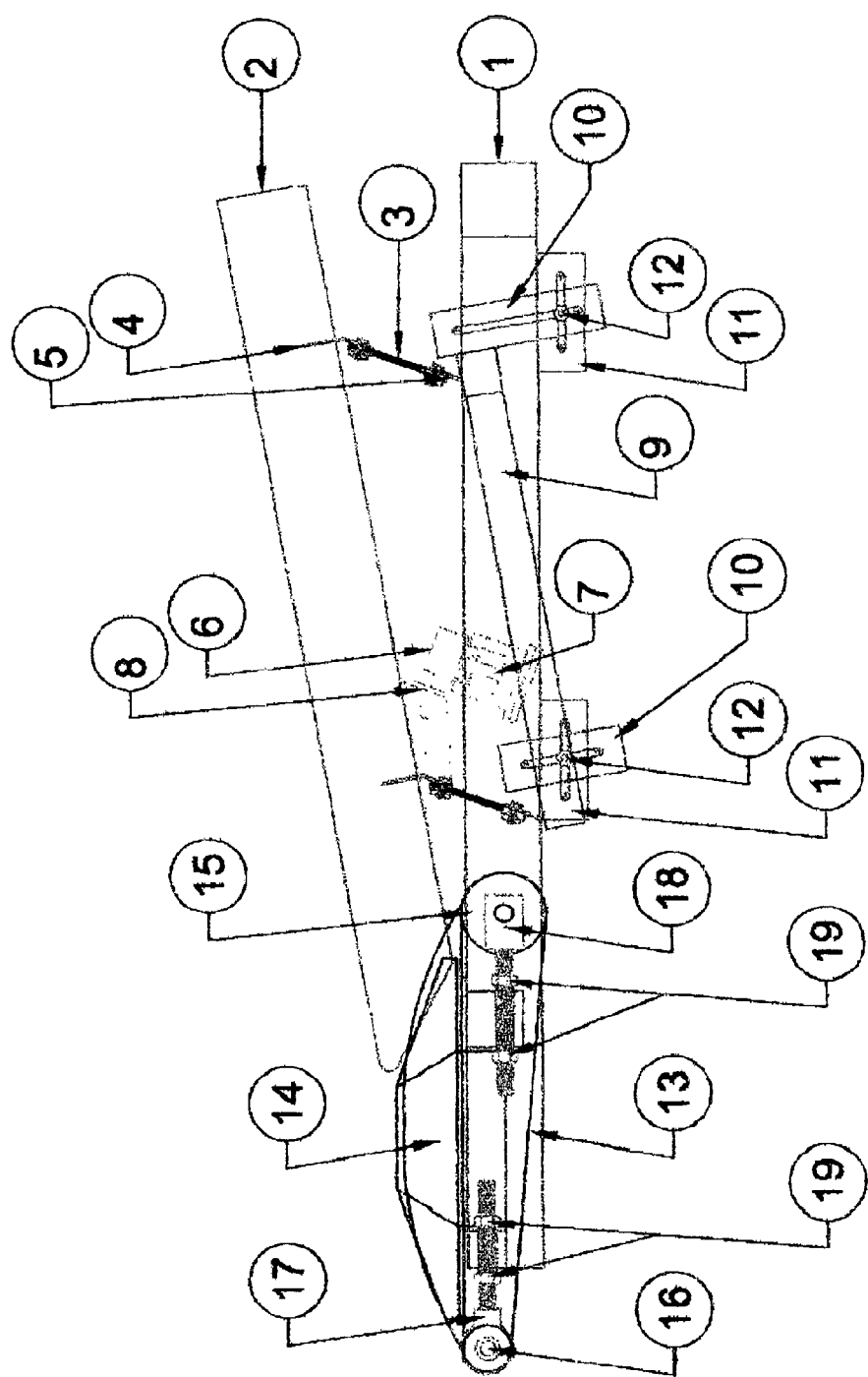
FIG. 1 shows a side view of an exemplary embodiment of the invention utilizing a single piece, continuous contoured inclined chute with one angle of declination depositing onto the bottom spacing conveyor.

FIG. 1 shows a side view of an exemplary embodiment of the invention utilizing a single piece, continuous contoured chute with one angle of declination. The exemplary embodiment shown in the side view comprises a main frame 1 that supports and provides attachment for all of the components of the machine. The machine operates by having portioned pieces 1000 drop onto the receiving area 20 of the vibratory contoured chute 2 at the upper right end of the vibratory contoured chute 2 in FIG. 1.

Vibratory contoured chute 2 is typically set at an downward incline, as seen in the Figures of the application, from right to left to provide for motion due to gravity as well as the motion that may be generated by the vibratory motion of the chute. However, this is not a limitation of the instant invention and where reference is made to motion from right to left it can equally be made to motion from left to right without departing from the spirit of the invention. Typical angles of declination of the vibratory contoured chute 2 are from about −10 to about 80 degrees from the horizontal relative to the machine. The angle of declination of the exemplary embodiment of the vibratory contoured chute 2 of FIG. 1 is about 25 degrees.

For example, the contoured chute 2 can be suspended upon two vibratory membrane springs acting as resilient members 3 are set at two different angles to the common section of the contoured chute 2. The membrane springs are one example of the resilient member 3, the membrane springs allowing for specific control of the vibration in one plain. Coil springs and other springs could be used, but may result in additional unwanted motion, making synchronization difficult.

The length of contoured chute 2 is variable and typically determined by the amount of portioned pieces 1000 that must be spaced. As an example where the portioned pieces 1000 being fed onto the contoured chute 13 are reasonably spaced with only an occasional portioned pieces 1000 that may be too closely spaced the length of the contoured chute 2 may be held to 2 feet in length. Where the portioned pieces 1000 may be fed from dump conveyors or trays the spacing and feed rate could have a large degree of variation. This may have a feed rate where portioned pieces 1000 may be deposited onto the contoured chute 2 at a high rate for a short period of time and then for a relatively equal length of time no portioned pieces 1000 would be deposited. For this application a long contoured chute 2 would be needed so that the pieces could accumulate or be stored on the contoured chute 2 and then be evenly fed out through, for example, a spacing conveyor belt 13 or pocketed indexing wheel 33, as further described below. There may also be a need to store or accumulate portioned pieces 1000. An example would be where subsequent machines would need to stop and then restart. In this instant the spacing conveyor belt 13 or pocketed indexing wheel 33 may stop and the contoured chute 2 would be able to continue to accept and accumulate portioned pieces. When the subsequent machines were able to again accept portioned pieces the spacing conveyor belt 13 or pocketed indexing wheel 33 would restart and remove portioned pieces from the contoured chute 2.

Figure 2:
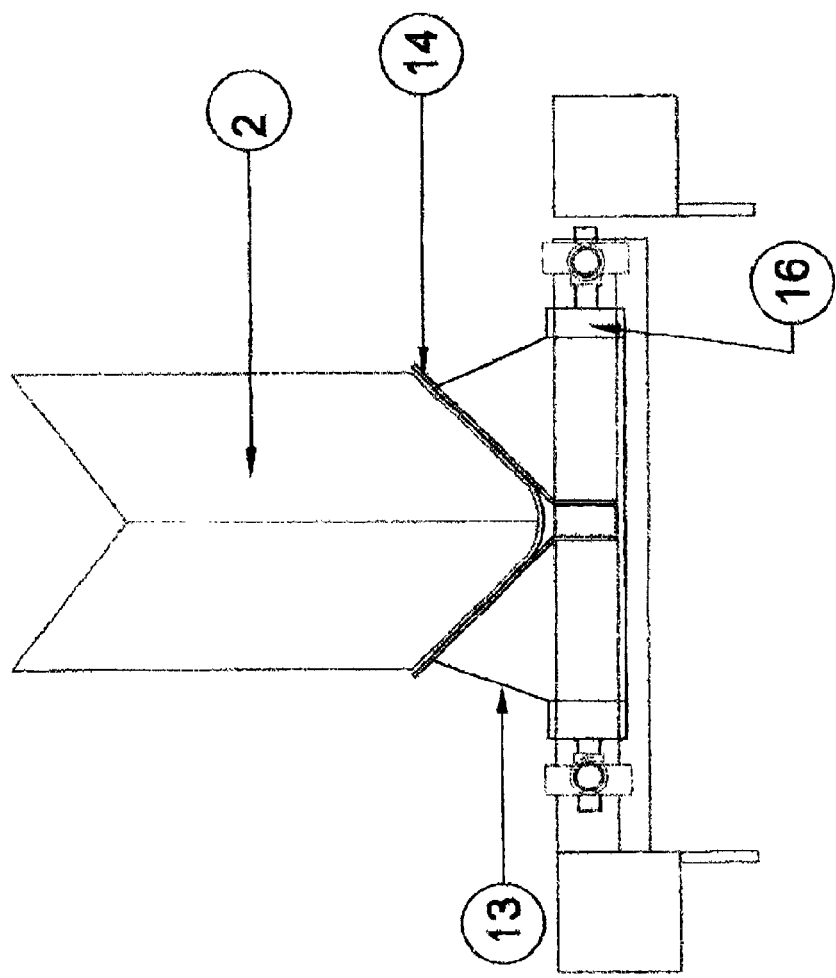
FIG. 2—shows a front view of the first embodiment of FIG. 1 utilizing a single piece continuous contoured chute with 1 angle of declination depositing onto the bottom spacing conveyor.
Figure 6:
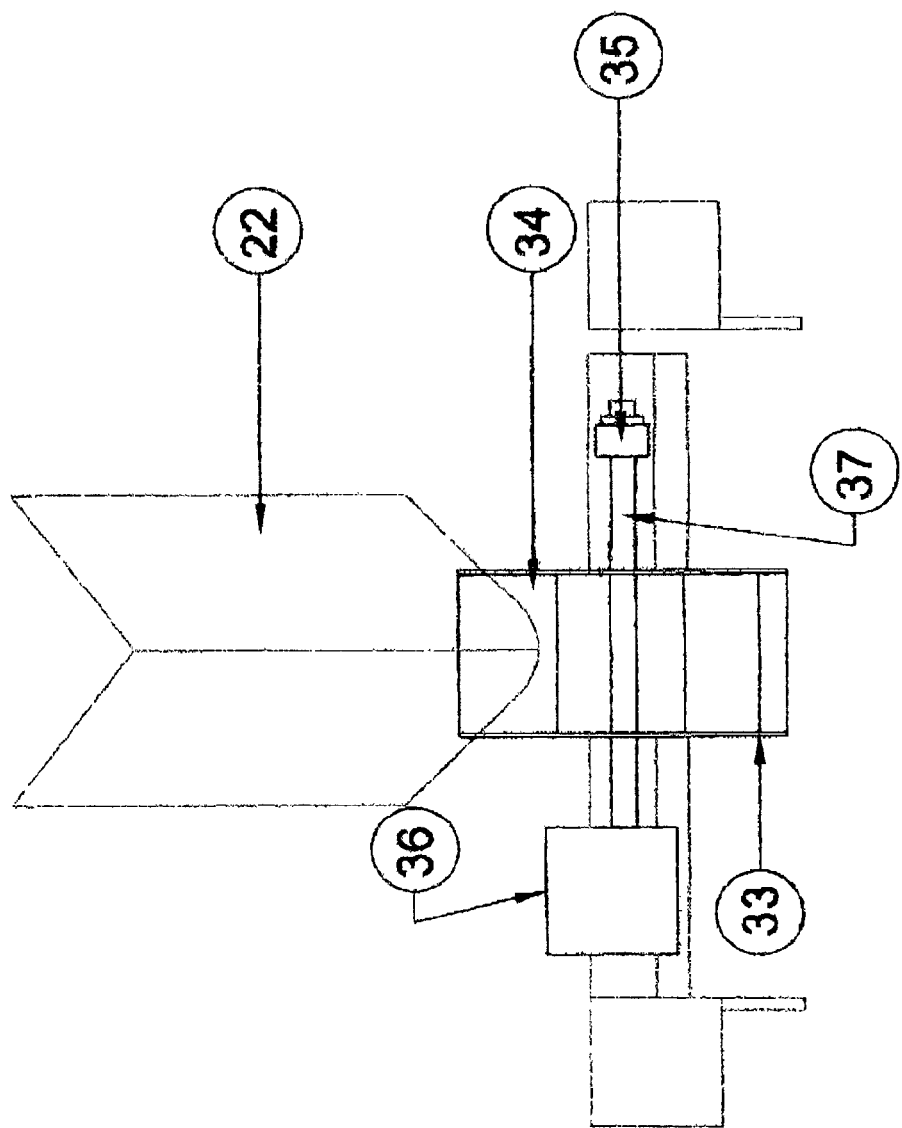
FIG. 6 shows a front view of the embodiment of FIG. 5.

The shape of the contoured chute 2 is typically in the form of a trough. It is tapered from a wider section at the top to narrower at the bottom but typically the same width through the length of the contoured chute 2, as more clearly seen in FIGS. 2, 6, and 9, which show end views of the exemplary embodiments and the chutes of the exemplary embodiments. This provides a means by which the portioned pieces 1000 can travel towards the longitudinal centerline of the contoured chute 2 when the portioned pieces 1000 drop onto the receiving area 20 of the contoured chute 2. The taper or shape of the contoured chute 2 also helps ensure that as the portioned pieces travel along the longitudinal centerline of the contoured chute 2. The narrowing of the vibratory contoured chute 2 will move the portioned pieces 1000 into line. That is a relatively straight line without having the portioned pieces 1000 move laterally out of line as they come together during accumulation at the exit of the chute.

The taper or shape of the contoured chute 2 also allows for portioned pieces 1000 of different sizes to be accommodated without the need for width or side guides or adjustment thereof. This accommodates portioned pieces 1000 of all sizes and allows them to remain in a reasonably straight line. This vibratory contoured chute 2 may also be set, or may be set with a final portion of the chute, at horizontal or a very slightly inclined, where the portioned pieces 1000 would travel upwards to the discharge end 21 due to the vibratory motion of the contoured chute 20.

In instant invention vibration is used as a means of moving or conveying a portioned piece down along the vibratory contoured chute 2. This is set in motion by a vibrator 7, which can for example be a reciprocating piston type vibrator driven by compressed air. Other examples of vibrators that can be employed to impart this vibratory force or motion include, but are not limited to, compressed air driven vibrators; mechanically driven reciprocating or offset rotating masses; and electrical or magnetic vibrators.

In the exemplary embodiment shown the angle of the resilient member 3 relative to the contoured chute 2 causes the portioned pieces 1000 to be carried forward as the vibratory motion of the contoured chute 2 goes up and to the left relative to the main frame 1 in FIGS. 1, 3,4,5,7,8 and 11. When the vibrative motion of the contoured chute 2 goes down and to the right the momentum of the moving portioned piece 1000 will cause it to continue to move up and to the left as it looses contact with the chute. As the moving portioned piece 1000 losses upward motion due to gravity it will start to drop until it again strikes the surface of the contoured chute 2. During the period of time that the portioned piece 1000 is being driven upward (and to the left by the motion of the chute) plus the time while it is airborne the moving portioned piece 1000 is constantly moving to the left. The actual operating motion is rapid and so the moving portioned piece 1000 appears to be vibrating or floating constantly to the left.

The overall effect on the moving portioned piece 1000 is that it will be driven down the vibratory contoured chute 2 so long as the speed or rate and magnitude or amplitude of vibratory motion is great enough to allow for the moving portioned piece 1000 to loose contact with the contoured chute 2 during application of the vibratory motion. It is the angle of the movement of the moving portioned piece 1000 relative to the moving surface that the product travels, in this case the vibratory contoured chute 2, which allows the instant invention to operate. In the unit as depicted in FIG. 1, the vibratory motion is perpendicular to the at least one resilient member 3. In additional embodiments, the at least one resilient member 3 can be a coil spring and the motion of the spring would be parallel, or perpendicular, to the center line of the spring.

The motion of the material is principally controlled by the angle that the at least one resilient member 3 makes to the chute. As previously stated when the resilient member 3 is mounted substantially perpendicular to the contoured chute 2, as in FIG. 1, the motion imparted will be predominantly lateral with little to no vertical motion. As the resilient member 3 is brought closer to being parallel to the contoured chute 2 the degree of vertical motion increases and the amount of lateral motion decreases. Depending on various factors such as the angle of declination of the contoured chute 2, type of material to be moved, desired speed of the material to be moved and desired driving force to be exerted onto the product, an appropriate angle for the attachment of the at least one resilient member 3 to the contoured chute 2 can be determined.

The lower the viscous nature of the portioned pieces 1000 the greater the required amplitude of vibration required as the tacky portioned pieces 1000, for example dough, has a tendency to absorb the vibration and flow laterally when not constrained by the sides of the chute and or adjacent portioned pieces 1000. As the portioned piece 1000 becomes more viscous, the ability to flow or absorb vibration decreases and therefore the amplitude of vibration required for a given speed will decrease.

The speed or frequency of vibration is also significant in that if the vibration or frequency is very high the portioned piece 1000 will not be able to utilize a significant portion of the vibration movement due to the lack of time for it to fall due to the force of gravity. In the case of overly high vibratory frequencies the portioned piece may absorb the major portion of the vibration and have little movement. A slower vibration frequency of the same amplitude would allow the portioned piece to drop a greater distance prior to being absorbed in the next upward and to the left motion of the contoured chute 2 thereby with the same amount of vibration absorption travel further than with a higher vibrative frequency.

The required speed of portioned piece travel may also be influenced by the size of the pieces and the rate that they must be moved at. An example being, if one were spacing bread dough pieces of 4 inch diameter at 120 pieces per minute the rate of travel could not be less than 480 inches per minute but when at running bread dough pieces at 40 pieces per minute the rate of 480 inches per minute would be too high. The typical movement speed of the chute 2 is about two to four times the length of portioned product diameter multiplied by the average delivery rate of portioned pieces, but may be higher or lower depending on the product. Thereby allowing the portioned pieces to be quickly taken away from the receiving area 20.

Another example is a case where it is desirable to "levitate" the portioned pieces 1000, through the use of vibratory motion, to be transferred with a low pushing force so that product may easily float into position. In this case, resilient member 3 may be mounted at an angle substantially parallel or perpendicular to the contoured chute 2. Where aggressive movement is required the at least one resilient member 3 may be mounted at a 45 degree angle to the contoured chute 2. For instance, in the exemplary embodiment of FIG. 11, unlike the embodiment of FIG. 1, the at least one resilient member 3 comprises two resilient members that are mounted at dissimilar angles. The angle of the resilient members 3, on the right or where, in this case, the receiving area 20 of the portioned pieces 1000 are deposited, is at an angle of approximately 45 degrees. This provides for quick and aggressive movement of the portioned pieces 1000 to the left and down the vibratory contoured chute 2. The second resilient member is at a lower angle relative to the first for a slower, less aggressive forward movement of the portioned pieces 1000.

This placement of the resilient member 3 at the specified angles on the one vibratory contoured chute 2 provides for a strong aggressive movement of the portioned pieces 1000 when deposited onto the contoured chute 2. This being beneficial in taking the portioned piece 1000 away from the receiving area 20 of the contoured chute 2 allowing for the deposit of the next portioned piece 1000 with out interference of the previous portioned piece 1000. If this movement is too slow when two or more portioned pieces 1000 come in close proximity to each other, they could fall one atop the other. This would result in a double portion, causing a double product or a jam in a subsequent machine. Thus the angles of the resilient members relative to the chute and the angles of the chute are important to the invention.

As the portioned pieces 1000 travel to the left and down the contoured chute 2 the speed of the portioned pieces 1000 is reduced. This decrease in velocity and driving force allows the portioned pieces 1000 to come together in the lower left portion of the contoured chute 2. As the portioned pieces 1000 approach the discharge tip 20a of the vibrating contoured chute 2 the driving force on the portioned piece 1000 is minimal and therefore the pieces can collect to the point where there discharge speed may be best controlled by the speed of the spacing conveyor belt 13.

Figure 3:
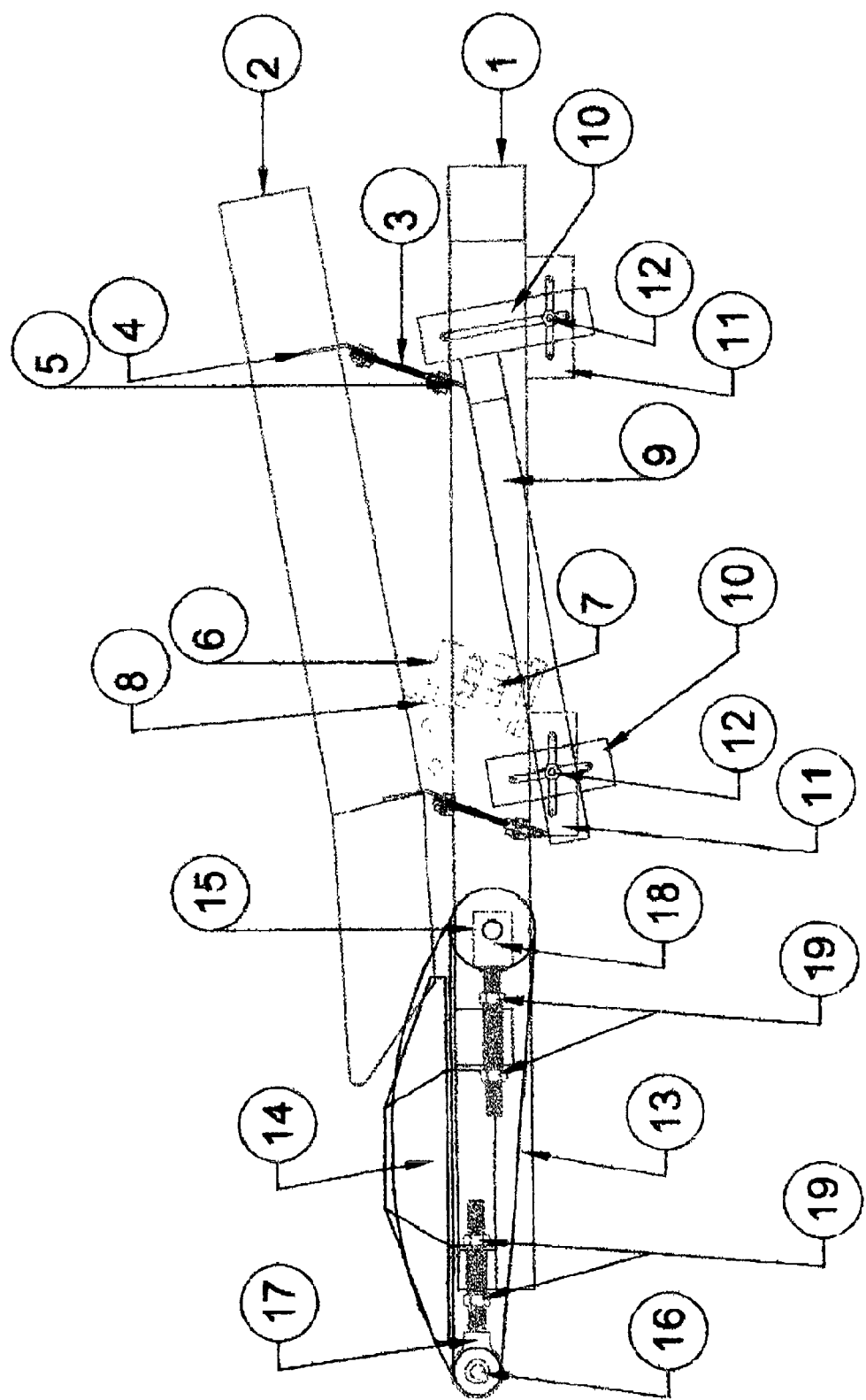
FIG. 3 shows a side view of an exemplary embodiment with one piece contoured chute with two declination angles depositing onto the bottom spacing conveyor.
Figure 4:
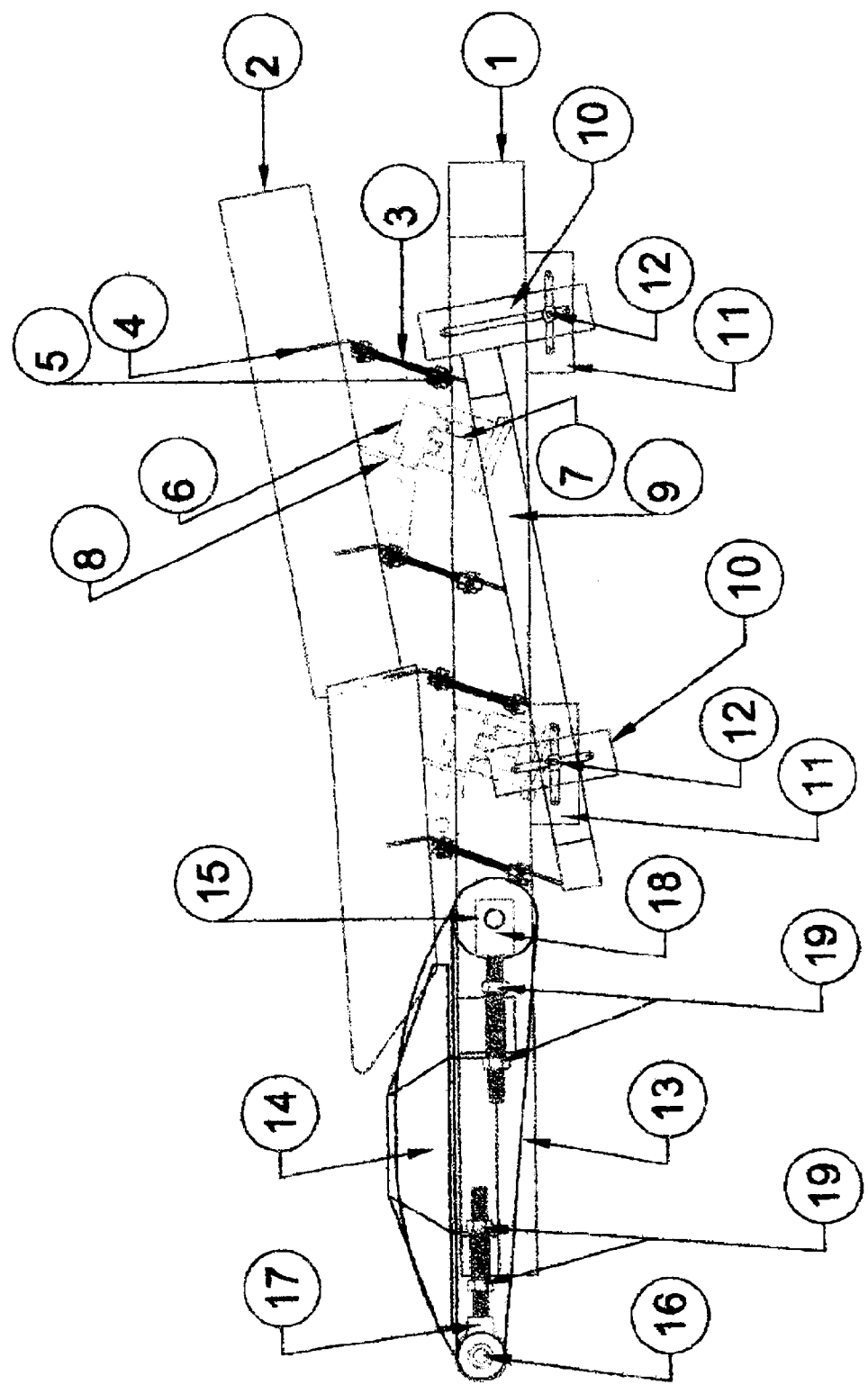
FIG. 4 shows a side view of a exemplary embodiment with two piece contoured chute with two declination angles depositing onto the bottom spacing conveyor.

FIG. 3 shows an exemplary embodiment with one piece contoured chute with two declination angles depositing onto the bottom spacing conveyor. The vibratory contoured chute 2 may be made of various sections, which are welded or joined to form a one piece contoured chute with different angles of declination over the length of the contoured chute 2. FIGS. 4 and 8 show side views of two additional exemplary embodiments. FIG. 4 shows a side view of an exemplary embodiment with two piece contoured chute with two declination angles depositing onto the bottom spacing conveyor. This would result in multiple chutes or portions of chute with a respective sub-section receiving area and discharge tip, for example a second chute would have a second receiving area and a second discharge are and tip. An example of this can be seen in FIG. 4 and also in FIG. 7 where the first portion of the inclined contoured chute 2, where the portioned pieces 1000 are first deposited, would have the greatest degree of declination so as to accelerate portioned pieces 1000 downward to the discharge tip 20*a* point of the second portion of chute 2 as quickly as possible. At the middle or end of the contoured chute 2 a separate chute is added so that the degree of declination would decrease so as to produce a lower velocity zone as compared to the previous section of higher declination. The second chute would have a receiving area and in communication with a discharge tip of the first chute.

Figure 7:
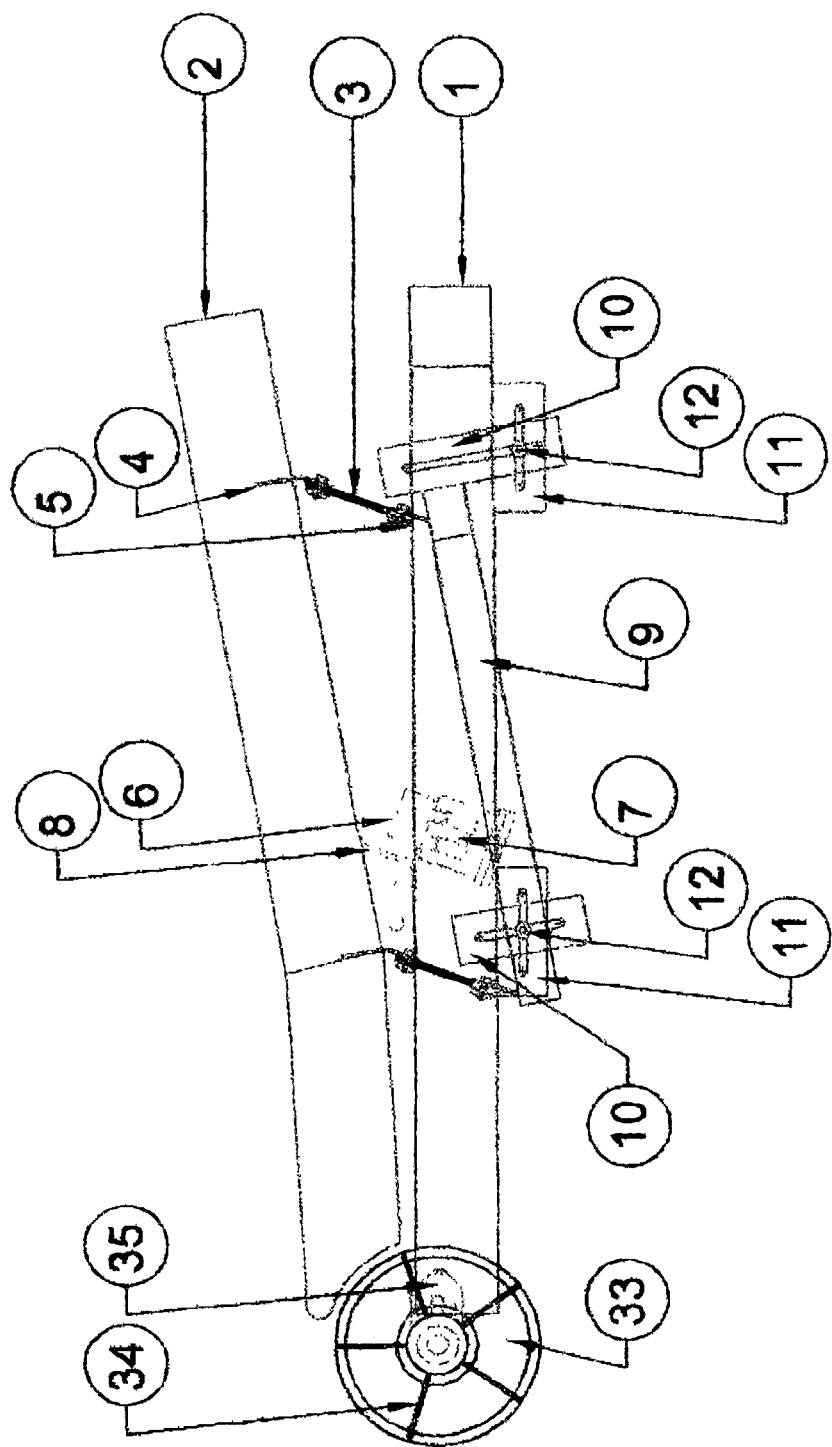
FIG. 7 shows a side view of an exemplary embodiment with one piece contoured chute of 2 declination angles depositing into the pocketed indexing wheel.
Figure 8:
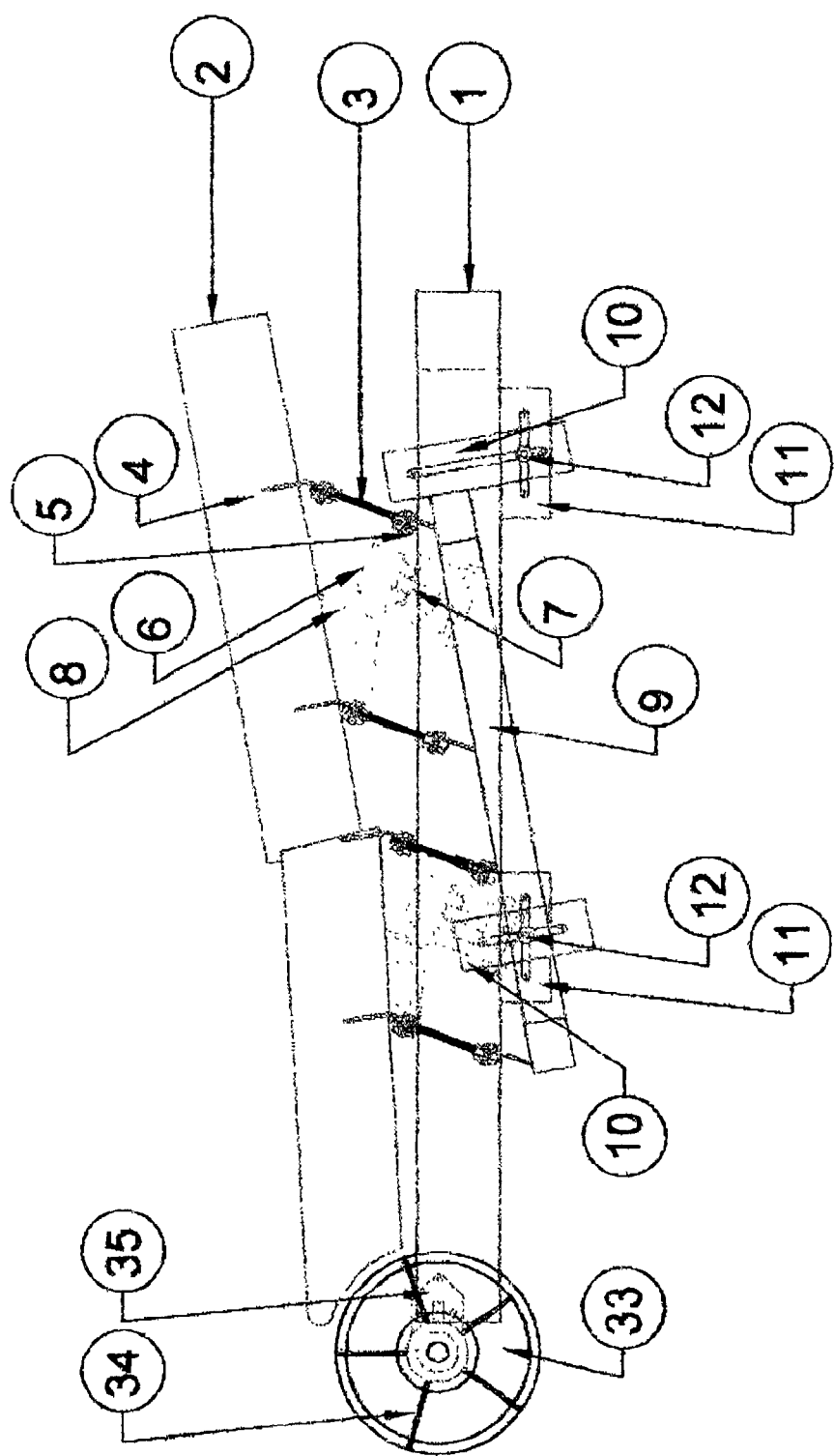
FIG. 8 shows a side view of an exemplary embodiment with a two piece contoured chute with two declination angles depositing onto the pocketed index wheel.

FIGS. 3 and 7 show other exemplary embodiments where multiple changes in declination angle would be present in over the length of the contoured chute 2. These exemplary embodiments have a bend in them changing the declination angle. This can also include where the contoured chute 2 would be of a radiused design or continuously changing degree of declination. An example of a constant radius contoured chute 2 would be where the discharge area 20*a* would be approaching horizontal and as the chute goes from discharge point to receiving point the angle of declination of the chute becomes continuously greater, approaching or passing 25 degrees. One such cross-sectional shape can be shown as a constant radius would be defined where all lines drawn perpendicular to the contoured chute 2 would meet at a common intersection point. A further shape could include a non-continuous radius would be where the radius of the contoured chute would change over the length of the chute or as one moves from the discharge tip 20*a* to the receiving area 20. An example of this type of chute would be where the discharge tip of the contoured chute 2 would be approximately horizontal with the contoured chute quickly going to inclined. The radius of curvature here would be quite small as compared to the radius of curvature at the receiving area of the contoured chute 2. At the receiving area 20 of the contoured chute 2 the radius of curvature would be greater and therefore the shape being flatter or not as sharply curved as in the discharge tip 20*a*.

Whether it is through the use of separate sections or bending a single piece chute, the second declination angle or second vibratory chute section modify the movement of the moving portioned pieces 1000 by varying the degrees of upward motion imparted in them. If the angle of the contoured chute or chutes 2 and the angle of the resilient members 3 is not varied, then the vibratory motion of the contoured chute 2 would be constant and therefore the higher speed desired to initially move the piece would decrease the ability of the portioned pieces 1000 to gently come together. The greater aggressive force would cause the portioned pieces 1000 down and onto the spacing conveyor belt 13 too quickly. Instead the ability to collect the portioned pieces is improved by varying the angle of declination. This is what allows randomly fed pieces to come together and be fed out in a uniformly timed sequence.

If this contoured chute 2 were to be used without the decreasing driving force imparted on the moving portioned pieces 1000 in conjunction with a pocketed indexing wheel 33 the portioned pieces 1000 would effectively be forced into a pocket that is formed in the pocketed indexer wheel 33 between the dividers 34. In the event that a pocket comes open early there is a high degree of probability that once the first portioned piece 1000 enters the pocket a second piece would be forced into this pocket resulting in a "double", a condition where two portioned pieces 1000 are delivered or metered as one from the invention and into a possible subsequent machine. The use of, for example, a two degree chute declination at the end of the single piece vibratory contoured chute 2 or in the second vibratory contoured chute allows for the appropriate accumulation of the portioned pieces. As mentioned it is also possible to accomplish this with a chute with multiple bends or changes of the angle of declination along or through an arced trough where the arc could be a constant radius or a parabolic curve.

Also, this reduction in speed can be accomplished by using dissimilar angles of attachment for the at least one resilient member 3, for lower forward components of the motion used to drive the moving portioned pieces 1000 at the discharge end 20*a* of the vibrating contoured chute 2 and therefore more uniform placement of portioned pieces 1000 onto a spacing conveyor 13 or pocketed indexing wheel 33.

The angle of declination of the contoured chute 2, vibrator frame 9 and all previously mentioned parts can be adjusted by loosening, for instance, threaded fastener 12 and allowing vertical adjustment brackets 10 to move relative to the horizontal adjustment brackets 11.

The vibratory motion of the contoured chute 2 causes the portioned piece 1000 to travel down the contoured chute 2 going, or relative to the figures, from the upper right side to the lower left side of the contoured chute 2. At the bottom of the contoured chute 2 the portioned piece 1000 may be deposited onto, for example a spacing conveyor 13 or a pocketed indexing wheel 33. These combinations are further discussed in relation to FIGS. 1 thru 8 and 11.

The contoured chute 2 can deposit to a further metering processing machine, for example either a spacing conveyor belt 13 or an indexing wheel 33. From the spacing conveyor belt 13 or indexer wheel 33 the portioned product 1000 can then be deposited into a still further subsequent processing machine in a spaced manner. The combination of the vibrating contoured chute 2, with appropriately set angles of attachment of the at least one mount plates 4 and the resilient members 3 or in combination with changing angles of declination in the chute, allow the moving portioned pieces 1000 to be fed to the spacing conveyor or rotating pocketed wheel as the conveyor or wheel requires the product. Through the appropriate adjustment of the angles of the at least one resilient member 3 which can be in adjusted alone or in combination with changing angles of declination in the chute 2, allow the moving portioned pieces 1000 to be fed to the spacing conveyor or rotating pocketed wheel as the conveyor or wheel requires the product. Thus the instant invention brings about the desired effect of holding, accumulating and uniformly feeding portioned pieces.

Figure 11:
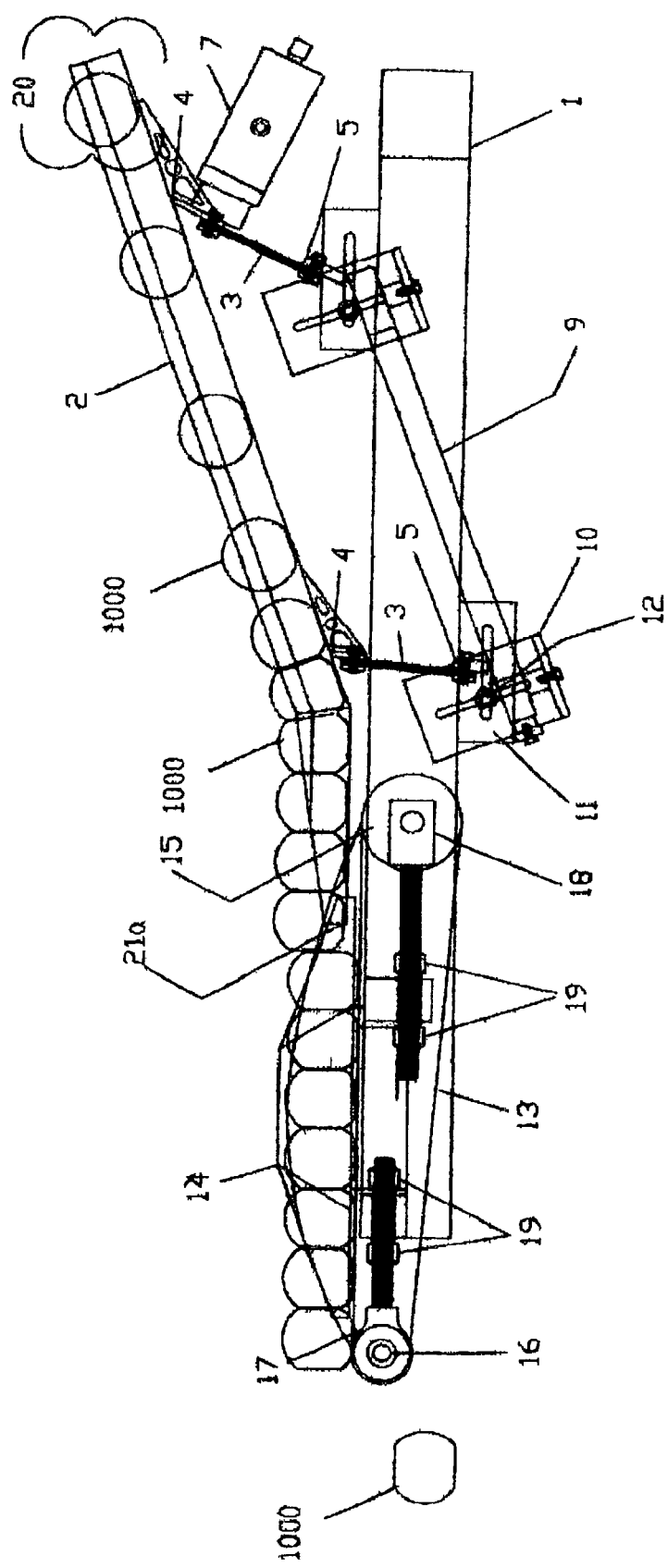
FIG. 11 shows a side view of an exemplary, having a single piece continuous contoured chute with two angles of declination depositing onto the bottom spacing conveyor.

FIG. 11 shows a side view of a still further exemplary embodiment with a one piece vibratory contoured chute having two declination angles depositing onto the bottom spacing conveyor. The exemplary embodiment shown in the side view of FIG. 11 comprises a main frame 1 that supports and provides attachment for all of the components of the machine. The machine operates by having portioned pieces 1000 drop onto the receiving area 20 of the contoured chute 2 at the upper right end of the contoured chute 2 in FIG. 11.

Contoured chute 2 is typically set at an downward incline, as seen in the Figures of the application, from right to left to provide for motion due to gravity as well as the motion that may be generated by the vibratory motion of the contoured chute 2. However, this is not a limitation of the instant invention and where reference is made to motion from right to left it can equally be made to motion from left to right without departing from the spirit of the invention. Typical angles of declination of the vibratory contoured chute 2 are from about 0 to about 80 degrees from the horizontal relative to the main frame 1. The angle of declination for the first portion of the of the exemplary embodiment of the vibratory contoured chute 2 of FIG. 11 is about 25 degrees from the horizontal relative to the main frame 1. A second portion of the contoured chute 2 in the exemplary embodiment shown in FIG. 11 has a variation in the declination angle, such that the declination angle decreases to about between minus ten degrees and ten degrees from the horizontal relative to the main frame 1. A preferred angle of declination for the second portion of the chute 2 is zero degrees or in line with the horizontal of the main frame 1. The vibratory contoured chute 2 sloping downward to, for example, the spacing conveyor belt 13 or pocketed indexing wheel 33. This angle may be increased as required to provide additional gravitational pull so as to move portioned pieces 1000 down the inclined contoured chute 2 faster or at a greater velocity as compared to when contoured chute 2 would be at a lower angle from the horizontal. Typically this angle could go above 25 degrees but at higher declinations, such as above 30 degrees, the portioned piece 1000 may start to roll down the declined vibratory contoured chute 2 depending on the product. The declination angle of contoured chute 2 may also be reduced to horizontal or inclined upward to the discharge tip 20a or to the spacing conveyor belt 13 or pocketed indexing wheel. This would be possible for all types or shapes of contoured chutes 2.

The shape of the contoured chute 2 is typically in the form of a trough. It is tapered from a wider section at the top of the chute to narrower section at the, the bottom being of consistent or continuous width throughout with the sides tapering to a higher angle of inclination or "narrowing" along the length of the contoured chute 2, as more clearly seen in FIGS. 6 and 9 which show an end view of an exemplary embodiment and views of other alternate designs. This provides a means by which the portioned pieces 1000 can travel towards the longitudinal centerline of the contoured chute 2 when the portioned pieces 1000 drop onto the receiving area 20 of the contoured chute 2. The taper or shape of the contoured chute 2 also helps ensure that as the portioned pieces travel along the longitudinal centerline of the contoured chute 2 the pieces will be kept in line. That is a relatively straight line without having the portioned pieces 1000 move laterally out of line as they come together during accumulation at the exit of the contoured chute 2.

The taper or shape of the contoured chute 2 also allows for portioned pieces 1000 of different sizes to be accommodated without the need for width or side guides or adjustment thereof. This accommodates portioned pieces 1000 of all sizes and allows them to remain in a reasonably straight line. This vibratory contoured chute 2 may also be set horizontal or at a slight incline, at the discharge tip 20a is inclined and still allow for travel or movement of the portioned pieces 1000 due to the vibratory motion of the contoured chute 20.

In instant invention vibration is used as a means of moving or conveying a portioned product 1000 down along the vibratory contoured chute 2. This is set in motion by a vibrator 7, 7a, which can for example be a reciprocating piston type vibrator driven by compressed air. As compressed air is delivered to the vibrator the piston will start to reciprocate within the housing. This reciprocating motion causes a resulting reciprocating force to be transmitted through to the vibratory contoured chute 2 to which the vibrator 7 is rigidly mounted. Other non-limiting examples of vibrators that can be employed to impart this vibratory force or motion include other styles of air driven vibrators; mechanically driven reciprocating or offset rotating masses; and electrical or magnetic vibrators.

This vibratory force generated by the vibrator 7 will then translate into vibratory motion through deflection of an at least one resilient member 3. In the exemplary embodiment of FIG. 11, two resilient members 3 are shown. These resilient members 3 are also used to connect the vibrating contoured chute 20 to the vibrator frame 9 by the use of chute mount plates 4 and vibratory frame mount plates 5. The angle of the resilient member 3 is set as perpendicular or at an angle other than perpendicular to the contoured chute 2. The vibratory contoured chute 2 vibrates when the vibrator 7,7a imparts vibratory force to the contoured chute 2 which is attached to vibrator frame 9 through resilient member 3, mount plates 4 and frame mount plates 5. When the resilient members 3 are set at perpendicular angles relative to the vibratory chute 2 the resulting vibratory motion will be roughly parallel to the longitudinal axis of the chute. If the resilient members 3 are set at an angle to the chute, for example 20 degrees off of perpendicular with the contoured chute 2, then the vibratory motion will be a combination of two vectors. One vector being parallel to the longitudinal axis of the contoured chute 2, the other vector being perpendicular to the longitudinal axis of the contoured chute 2.

The exemplary embodiments of the instant invention shown in FIGS. 1, 4 and 11 include a spacing conveyor. The combination of the vibratory contoured chute 2 and spacing conveyor belt 13 allow the portioned pieces 1000 to be fed in a uniform sequence from the contoured chute 2 to the spacing conveyor belt 13 and uniformly fed into subsequent processing machinery. The speed and operation of the spacing conveyor belt 13 determines how close together the portioned pieces 1000 may accumulate. The best operation being where the portioned pieces 1000 are allowed to accumulate one-fourth to one-third of the way up the inclined contoured chute 2. This would ensure that the portioned pieces 1000 on the spacing belt would form one uninterrupted line and therefore drop off of discharge the end of the spacing conveyor belt 13 at a consistent interval basis.

As the portioned pieces 1000 are deposited on the receiving area 20 of the contoured chute 2 they will travel down the contoured chute 2 toward the spacing conveyor belt 13 which is formed to a parabolic or cupped shape by the use of contour plates 14 in the preferred embodiment. The contoured plates 14 causing the spacing conveyor belt 13 to form to the required cupped or parabolic shape as the belt passes onto/between and through the contoured plates 14. The belt will go back to its original flat profile or shape as it passes beyond the contour plates and approaches the take up pulley 16.

The spacing conveyor belt 13 taking the portioned pieces 1000 from the inclined, contoured chute 2 with the portioned pieces 1000 remaining in intimate contact with the adjacent portioned pieces 1000 in a reasonably straight line. The spacing conveyor belt 13 carries these portioned pieces 1000 to the end of the spacing conveyor belt 13 where they are allowed to pass over the take up pulley 16 and pass onto or fall into the subsequent processing machine.

In alternate applications the contour plates 14 could be substituted by rollers rotating about a fixed axis, where the roller axis is parallel to the upper portion of the contour of the spacing conveyor belt 13 and perpendicular to the direction of the spacing conveyor belt 13 travel. The contour of the spacer conveyor belt 13 being able to capture and hold the portioned pieces 1000 in line since the portioned pieces 1000 would be traveling down and collecting on the contoured chute 2 prior to the point where the portioned pieces 1000 transfer onto the spacing conveyor belt 13.

Through the accumulation of the portioned pieces 1000 on the contoured chute 2 and the vibratory motion thereof, a slight pressure would be present tending to push the portioned pieces 1000 toward the spacing conveyor belt 13 or pocketed indexing wheel 33. The resulting pushing force could otherwise cause a lateral shingling effect on the portioned pieces 1000 were it not for the contour of the spacing conveyor belt 13. The spacing conveyor belt 13 taking the shape of the contour inducing means as previously described by the tension induced into the spacing conveyor belt 13 by the opposing force of the drive pulley 15 and the take-up pulley 16. Position of the drive pulley 15 and take-up pulley 16 may be reversed in alternate installations. Tension of the rollers being maintained by take up pulley adjusting rods 17 and drive pulley adjusting rods 18 and adjustment nuts 19. In this application the drive pulley 15 is a commercially available motorized pulley where the motor and any or all required gears used to transmit the rotational motion of the motor to the outside of the pulley is contained inside the pulley. This motorized pulley was used as the most effective way to drive the spacing conveyor belt 13 based on simplicity, sanitation standards or clean operation, and compact self contained design. It would be possible to also drive this pulley from external sources.

Through rotation of the drive pulley 15 the spacing conveyor belt 13 will travel over the surfaces of the contour plates 14 or there equivalent. The portioned pieces 1000 deposited from the contoured chute onto the spacing conveyor belt 13 will thereby be carried on the surface of the spacing conveyor belt 13 and as the spacing conveyor belt 13 travels to and around the take-up pulley 16 the portioned piece 1000 will fall from the edge and into the subsequent machine and or conveyor.

The velocity of the spacing conveyor belt 13 can be adjusted, thereby maintaining the accumulation of the portioned pieces 1000 on the contoured chute 2 and the resulting continuous stream of portioned pieces 1000 which transfer from the contoured chute 2 to the spacing conveyor belt 13. This continuous stream of portioned pieces moving on the spacing conveyor belt and over the end of the take up pulley 16 ensures the even drop rate to the subsequent processing machine. The combination of declined contoured chute 2 with spacing conveyor belt 13 also allows for sequential or synchronized indexing of the pieces to machines which may be used to load or package the portioned pieces 1000. The spacing conveyor 13 may also be used to provide synchronized feeding or loading with dwell time periods. In the case of a required dwell time period, the spacing conveyor belt 13 can be stopped which will allow for accumulation of portioned pieces 1000 on the declined contoured chute 2. Once feeding of pieces is to resume the spacing conveyor belt 13 is started. A sensor at the discharge end of the bottom spacing conveyor may be used to allow for synchronized feeding of pieces.

Typical applications may be where: the spacing conveyor belt 13 will run allowing portioned product to pass from the contoured chute 2 onto the spacing conveyor belt 13. As the spacing conveyor belt 13 moves forward it will carry the portioned pieces 1000 to the end of the spacing conveyor belt 13 where as the spacing conveyor belt 13 goes around the take up pulley 16 the portioned pieces 1000 will fall from the spacing conveyor belt 13. To allow for indexed feed of the portioned pieces 1000 from the invention or to allow subsequent processing machines a means of sensing the presence or feed rate of approaching portioned pieces 1000 a sensor, for example a photo scanner, would be placed at the discharge end of the spacing conveyor belt 13 so that the sensor can detect the presence of a portioned piece 1000 as well as detect the gap or absence of a portioned piece 1000 when it drops off of the end of the spacing conveyor belt 13 as it goes over the small take up pulley 16.

The sensor would operate in that when the receiving or down stream machine receiving portioned pieces 1000 requires only one more portioned piece 1000 the sensor would open the electrical circuit controlling the movement of the spacing conveyor belt 13 when the sensor senses a space or effectively that the last required portioned piece 1000 has fallen from the spacing conveyor belt 13. The sensor would continue to hold the electrical circuit open until the receiving or down stream machine calls or demands the flow of portioned pieces 1000 to resume.

It may be required to feed groups or a specified number of portioned pieces 1000 to the receiving or down stream machine. In this application a sensor (not shown), such as a photo scanner, would be placed at the end of the spacing conveyor belt 13 so that the sensor can detect the presence and dropping of a portioned piece 1000 as well as detect the gap or absence of when a portioned piece 1000 drops off of the spacer conveyor belt 13 as it goes over the take up pulley 16. The sensor would then count the pieces being dropped and stop for a preset time after the count allotment has been reached.

Figure 5:
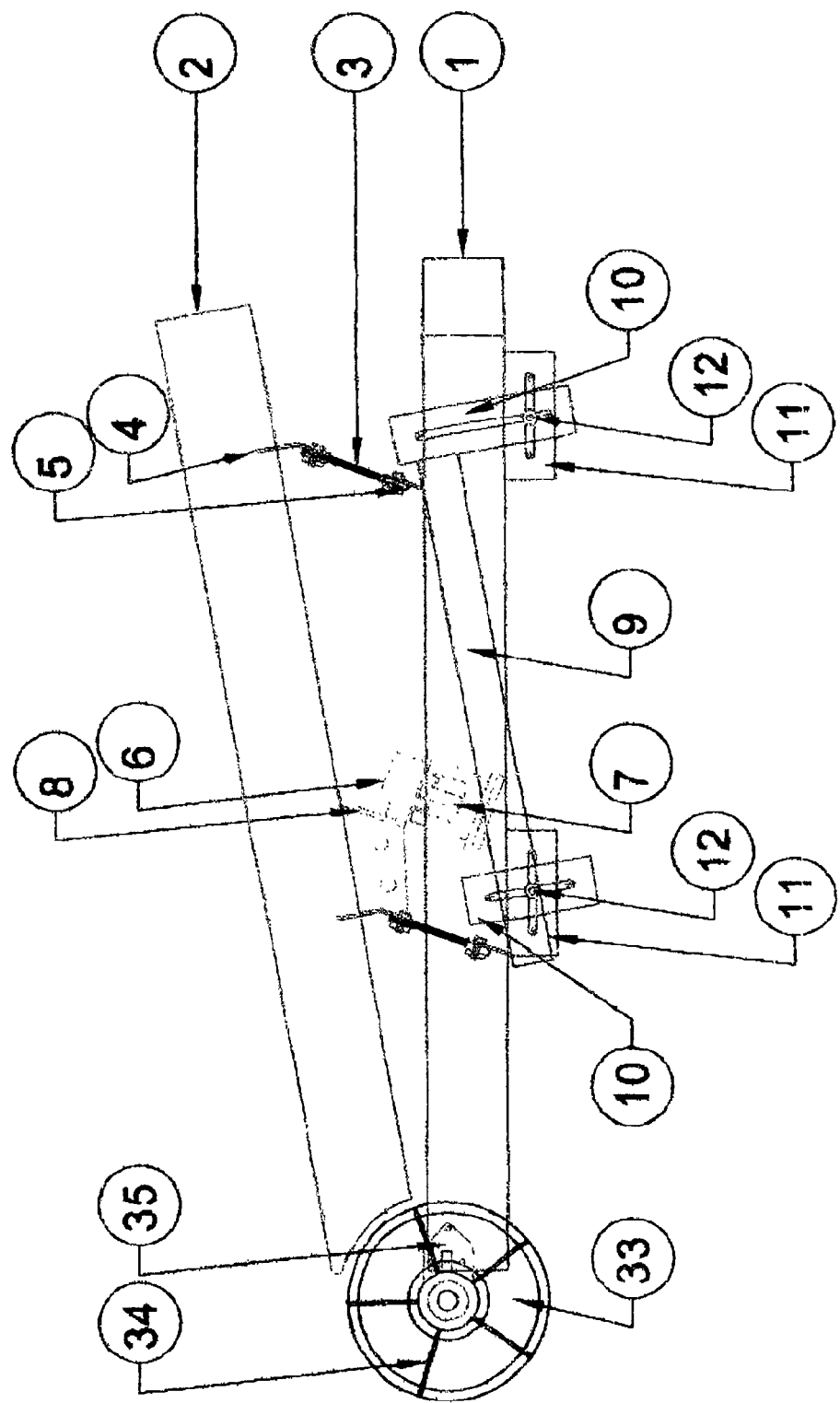
FIG. 5 shows a side view of an exemplary embodiment with a one piece i contoured chute depositing into a pocketed indexing wheel.

FIGS. 5, 7 and 8 show side views of further exemplary embodiments with indexing wheels.

FIG. 5 shows a side view of an exemplary embodiment with a one piece inclined contoured chute depositing into a pocketed indexing wheel. The vibratory contoured chute 2 in this embodiment feeds portioned pieces 1000 to a pocketed indexer wheel 33. The portioned product 1000 is fed from the vibrating contoured chute 2 to the pocketed indexing wheel 33. When the pocketed indexing wheel 33 rotates it would expose a pocket or cavity of the wheel so that a portioned piece 1000 can fall or rotate into the exposed pocket. Upon further rotation of the pocketed indexing wheel 1000, the portioned product 1000 would then be uniformly fed into the subsequent processing machine.

In this embodiment the portioned pieces 1000 are carried by the contoured chute 2 which is kept in vibratory motion and operates as outlined in respect to the description of the embodiment of FIG. 1. The portioned pieces 1000 traveling down the contoured chute 2 from the receiving area 20 to the discharge tip 20a. When the portioned piece 1000 reaches the discharge tip 20a of the contoured chute 2 it will drop into the cavity of the pocketed indexing wheel 35 containing dividers 34 being affixed perpendicular to the pocketed indexer wheel 33 sides. The embodiment showing dividers 34 creating five pockets which are equally spaced about the circumference of the pocketed indexer wheel, it is also possible to build or utilize a pocketed indexing wheel 33 with more than or less than 5 pockets. 4 or 6 pocketed indexer wheels also being commonly used in other applications and probably being acceptable in this application also. The pocketed indexing wheel 33 being rotated about its center axis in a counter clockwise rotation on indexer shaft 37 by indexer motor 36 of FIG. 6. The pocketed indexing wheel 35 rotating on the bearings of the motor and indexer bearing 35.

Pocketed indexing wheels being well known in industry and of common design. Operation of the pocketed indexing wheel being that as it rotates about the center axis in a counter clockwise fashion when viewed from FIG. 5. The pocketed indexing wheel 33 will then rotate counter clock wise as seen in FIG. 5 until the exposed portion of the pocket is sufficient for the portioned piece 1000 to fall into. The benefit of the contoured chute 2 being maintained in vibratory motion is that at the contoured chute 2 discharge tip 20a end, this vibratory motion exerts only a small pushing force on the portioned piece 1000. The pushing force being sufficient to move the portioned piece 1000 to the pocketed indexing wheel 33 but when a portioned piece 1000 misses entry into a pocket the portioned pieces 1000 will stay in line since the pushing force of the vibrating contoured chute 2 is not sufficient to cause the portioned pieces to be pushed above/below or to the side of an adjacent portioned piece 1000.

The degree of declination of the vibratory contoured chute 2 can be adjusted to suit the required velocity or feed rate of the portioned pieces 1000 that are to travel down the inclined contoured chute 2 to the bottom spacing conveyor. The degree of declination may also be adjusted to suit viscosity, pliability and or adhesion of the piece to the declined, contoured chute.

The described parts or components of this machine may be modified to be able to operate in a similar manner but utilizing parts made in a different fashion or shape but still provide an overall operation similar to the shown preferred embodiment. Other modifications may be made to which may be able to better suit other applications or operation with different products.

FIG. 7 shows a side view of an alternate embodiment with one piece inclined contoured chute of 2 declination angles depositing into the pocketed indexing wheel.

FIG. 8 shows a side view of an alternate embodiment with two piece inclined contoured chute 2 with two declination angles depositing onto the pocketed index wheel.

FIGS. 1–4, 10 AND 11 as described above provide a spacing conveyor belt 13 is passing over a contour inducing surface such as a pair or plurality of rollers or formed metal sides which causes the belt to cup and accept portioned pieces 1000 from the contoured chute 2. This spacer conveyor belt 13 will be set at a rate of speed (feet per minute of belt surface) which is typically visually set by observing that portioned pieces 1000 are metered into subsequent portioning machinery without having portioned pieces start to accumulate up the vibrator chute 2 and fill to the top of the vibratory chute 2. Portioned pieces 1000 should be present on the bottom portion of the contoured chute 2 and feed onto the discharge belt without producing large spaces between the portioned pieces 1000 on the discharge belt. Temporary surges in portioned piece 1000 delivery may cause some accumulation of portioned pieces 1000 on the contoured chute 2 which will then dissipate during the normal operation of the machine. Another method of setting discharge conveyor speed is to multiply the feed rate of portioned pieces 1000 by the diameter of the portioned pieces 1000 times a compressibility factor of the dough which represents how much the diameter or distance from contacting surface to contacting surface of portioned piece 1000 will decrease as the pieces contact and slide together due to there movement on the vibrating contoured chute 2.

The spacer conveyor belt 13 is only able to hold a portioned piece 1000 by stopping the movement of spacing conveyor belt 13. It is best suited to larger, higher viscosity portioned pieces 1000. If the portioned pieces 1000 are small and if the spacing conveyor belt 13 is not stopped at a critical point, the portioned piece could flow due to viscous motion and fall off of the end of the spacing conveyor belt 13. By comparison, the pocketed indexing wheel holds the portioned pieces 1000 in a positive pocket where they can not drop out of and subsequent portioned pieces are held in que on the contoured chute.

A pocketed indexing wheel 33, shown in FIGS. 5–8, are used where a greater degree of precision is required over the operation of the spacing conveyor 2 which is not considered as accurate. The pocketed indexing wheel 33 having the ability to hold and drop a portioned piece 1000 as a function of the rotational position of the pocket of the wheel. A use for this could be where portioned pieces 1000 are to be fed to a subsequent machine in groupings. A pan or tray may only be able to hold a grouping of, for example, eight of the portioned pieces 1000, which would be formed and fed by a subsequent machine to the invention. There may be a period of time where the subsequent machine can not accept portioned pieces 1000 such as when the tray to be loaded is changed for an empty tray. During this time period no portioned pieces 1000 would be allowed to drop into the subsequent machine. This would be accomplished by stopping the pocketed indexing wheel 33 at an angle which would allow the eighth portioned piece 1000 to fall but the next portioned piece 1000 would be held within the pocketed indexing wheel 33 with the rotation of the pocketed indexing wheel 33 stopped. The full tray could be replaced by an empty prior to restarting rotation of the pocketed indexer wheel 33. During the time when the pocketed indexer wheel 33 is stopped the contoured chute 2 would be kept in vibratory motion to accept and accumulate portioned pieces 1000 until the time when the rotation of the pocketed indexer wheel 33 is restarted.

FIGS. 9A and 9B show exemplary contours for the contoured vibratory chutes of the exemplary embodiments depicted. The contour may be of a radiused or parabolic shape as shown in the exemplary embodiment. It may also be made with a flat bottom and angled sides so as to laterally contain the portioned pieces. A combination of the previous shapes and profiles would also be acceptable. The outer edge of the contoured chute 2 being of function as to how to contain, align and transport the portioned pieces 1000 sides also act as a stiffener by adding longitudinal stiffness or rigidity to the contoured chute 2 to prevent or reduce the occurrence of low frequency vibratory nodes where the deflection of the contoured chute 2 can enter into a harmonic resonance and cause a discontinuity in the movement of the conveyed medium or as in this embodiment the movement of the portioned piece 1000.

The number of vibrating contoured chutes 2 may be varied from the single contoured chute 2 with a single vibratory motion generator as shown in FIG. 4 and FIG. 8 to a package of 2 or more vibrating contoured chutes 2 with multiple vibratory motion generators per contoured chute 2 section. Another exemplary embodiment would be where a two piece contoured chute 2 would be used. This would allow for a degree of adjustment to allow for separate adjustment of the speed of upper and lower (receiving and discharging) vibrating contoured chutes 2. This could allow for higher amplitude and angle vibrations to create quick travel of the portioned pieces 1000 when they are deposited onto the receiving end 20 of the upper or initial contoured chute 2. The portioned pieces 1000 would then quickly travel to the second vibrating contoured chute 2, which would operate at a vibratory motion that would produce a slower rate of travel. This operation would be able to quickly take randomly deposited portioned pieces 1000 and transport them to the lower or second contoured chute 2 where they would accumulate prior to being taken away by either a spacing conveyor belt 13 similar to the embodiment show in FIG. 11, or a pocketed indexing wheel 33 similar to the embodiment in FIG. 5.

This two or more contoured chute 2 vibratory control adjustment could also permit the stoppage of vibratory motion of the second contoured chute 2 if there are no portioned pieces 1000 present on the first vibrating contoured chute 2. While the second contoured chute 2 motion is stopped the first vibrating contoured chute 2 would be allowed to continue to operate thereby delivering portioned pieces 1000 to the second or final vibrating contoured chute 2. Thereby ensuring that the second vibrating contoured chute 2 will always operate in a full capacity or mode.

Angles of resilient member 3 to contoured chute attachment have been shown in FIGS. 1, 3, 4, 5, 7 and 8 as being equal at both or all mounting locations. This can be changed or varied to suit applications as required and illustrated in FIG. 11. Resilient member mounting locations may also be changed to suit required shape and requirements of invention. It is neither implied that resilient members are to be mounted as drawn angles in illustrations or that they are to be mounted at any of the locations shown in the illustrations.

The embodiments and examples discussed herein are non-limiting examples. The invention is described in detail with respect to preferred or exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A portioned piece spacing apparatus, comprising:
   an at least one contoured chute having at least one angle of declination relative to a horizontal plane upon which the apparatus is situated;
   a vibrating mechanism coupled to the at least one contoured chute;
   at least one resilient member supporting the at least one contoured chute, wherein the vibrating mechanism vibrates the chute in an at least one direction relative to the horizontal of the apparatus such that the portioned pieces are supported on the contoured chute and allowed to decelerate in a sequenced manner while proceeding toward a discharge tip of the contoured chute and wherein the deceleration of the portioned pieces in a sequenced manner is provided by a decreasing horizontal driving force transmitted from the vibrating mechanism through the at least one contoured chute and imparted on the portioned pieces.

2. The portioned piece spacing apparatus of claim 1, wherein the deceleration of the portioned pieces in a sequenced manner is provided by a decreasing driving force transmitted from the vibrating mechanism through said at least one resilient member.

3. The portioned piece spacing apparatus of claim 1, wherein the pieces that are supported on the contoured chute are allowed to accumulate in a spaced manner proximate to the discharge tip of the contoured chute.

4. The spacing apparatus of claim 1, wherein the at least one contoured chute has a contour comprising curved sides connected by a flat bottom.

5. The spacing apparatus of claim 1, wherein the at least one contoured chute has a contour comprising sloped sides connected by a flat bottom.

6. The spacing apparatus of claim 1, wherein the at least one angle of declination is a constantly decreasing angle of declination formed by an at least one chute having a decreasing radius of curvature.

7. The spacing apparatus of claim 1, wherein the at least one angle of declination includes a first angle of declination and a second angle of declination, the second angle of declination being lower than the first angle.

8. The spacing apparatus of claim 7, wherein the decrease in angle from a first angle to a second angle of declination reduces the speed of the portioned pieces moving from a receiving area of the contoured chute to the discharge tip of the contoured chute.

9. The spacing apparatus of claim 8, wherein the first declination angle is between about 0 degrees and about 45 degrees.

10. The spacing apparatus of claim 9, wherein the first declination angle is about 25 degrees.

11. The spacing apparatus of claim 8, wherein the vibration of the contoured chute and the lower second angle of declination allows the portioned pieces to accumulate at the exit of the contoured chute in consistently spaced manner.

12. The spacing apparatus of claim 11, wherein the second declination angle is between about −10 degrees and about 10 degrees.

13. The spacing apparatus of claim 12, wherein the second declination angle is about 0 degrees.

14. The spacing apparatus of claim 1, wherein said portioned pieces drop from said discharge tip from said contoured chute onto a further processing device.

15. The spacing apparatus of claim 1, wherein the at least one angle of declination is a series of declination angles formed by an at least one chute having a constant radius of curvature from a receiving area to a discharge tip.

16. The spacing apparatus of claim 14, wherein said further processing device is an spacing conveyor.

17. The spacing apparatus of claim 1, wherein the at least one declination angle comprises a single declination angle that is constant throughout the contoured chute and is between about −10 degrees and about 80 degrees relative to the horizontal plane of the apparatus.

18. The portioned piece spacing apparatus of claim 1, wherein the deceleration of the portioned pieces in a sequenced manner is provided by the decreasing driving force transmitted from the vibrating mechanism through said at least one resilient member in combination with a change in the angle of the portioned pieces relative to the contoured chute.

19. The portioned piece spacing apparatus of claim 1, wherein the decreasing driving force is provided as a function of at least one of: the position of the portioned piece on the at least one contoured chute, the angle of attachment of the at least one resilient member relative to the at least one contoured chute, the location of the portioned piece on the at least one contoured chute with respect to the location of the at least one resilient member, and the angle of declination of the at least one contoured chute.

20. The spacing apparatus of claim 1, wherein the angle of declination varies about 20 degrees relative to the contoured chute between the receiving area and the discharge tip.

21. A portioned piece spacing apparatus, comprising:
    an at least one contoured chute having at least one angle of declination, receiving area and a discharge tip;
    a vibrating mechanism coupled to the at least one contoured chute;
    at least one resilient member coupled at a resilient member angle to the at least one contoured chute and supporting the at least one contoured chute, wherein the vibrating mechanism vibrates the at least one resilient member such that the at least one contoured chute vibrates in at least one direction relative to the horizontal of the apparatus and the portioned pieces are supported on the contoured chute and allowed to decelerate through the transmission of a reduced horizontal velocity vector component transmitted from the at least one resilient member to the portioned pieces so that the portioned pieces are arranged in a sequenced manner while proceeding toward a discharge tip of the contoured chute.

22. The portioned piece spacing apparatus of claim 21, wherein the deceleration of the portioned pieces in a sequenced manner provided by the decreasing driving force is transmitted from the vibrating mechanism through said at least one resilient member.

23. The portioned piece spacing apparatus of claim 21, wherein the portioned pieces that are supported on the contoured chute are allowed to accumulate in a spaced manner proximate to the discharge tip of the contoured chute.

24. The spacing apparatus of claim 21, wherein the at lest one resilient member coupled at a resilient member angle comprises a first resilient member at a first resilient member angle.

25. The spacing apparatus of claim 24, first resilient member angle is between about 0 and about 80 degrees.

26. The spacing apparatus of claim 25, first resilient member angle is between about 20 and about 45 degrees.

27. The spacing apparatus of claim 24, wherein the at lest one resilient member comprises a second resilient member at a second resilient member angle.

28. The spacing apparatus of claim 27, wherein the second resilient member angle is equal to the first resilient member angle.

29. The spacing apparatus of claim 27, second resilient member angle is between about 10 and about 80 degrees.

30. The spacing apparatus of claim 29, second resilient member angle is between about 20 and about 45 degrees.

31. The spacing apparatus of claim 21, wherein the at least one declination angle comprises a single declination angle that is constant throughout the contoured chute and is between about −10 degrees and 80 degrees relative to the horizontal plane of the apparatus.

32. A method of indexing portioned pieces, comprising the method steps of:
vibrating a contoured chute with a longitudinal axis;
providing portioned pieces of product to a discharge receiving area on said contoured chute;
vibrating said product at an at least one angle so as to provide a movement vector comprised of at least one forward movement component relative to the longitudinal axis of the contoured chute;
aligning said portioned pieces along said contoured chute decreasing the at least one forward movement component to align and sequentially space the portioned pieces; and
removing said portioned pieces in a indexed manner.

33. The method of claim 32, further comprising the method step of varying the said at least one angle at which said portioned pieces are vibrated by changing an angle of a resilient member attached to said contoured chute.

34. The method of claim 32, further comprising the method step of varying the said at least one angle at which said portioned pieces are vibrated by changing a declination angle of said contoured chute.

35. The method of claim 32, further comprising the method step of varying the said at least one angle at which said portioned pieces are vibrated by changing an angle of a resilient member attached to said contoured chute and changing a declination angle of said contoured chute.

36. A portioned piece spacing apparatus, comprising:
an at least one contoured chute having a longitudinal center line, an at least one angle of declination, receiving area and discharge tip;
a vibrating mechanism coupled to the at least one contoured chute;
at least one resilient member supporting the at least one contoured chute, wherein the vibrating mechanism vibrates the chute such that the portioned piece moves upward and forward relative to the longitudinal centerline of the at least one contoured chute and the portioned pieces are supported on the contoured chute and allowed to decelerate in a sequenced manner while proceeding toward a discharge tip of the contoured chute wherein the deceleration of the portioned pieces in a sequenced manner is provided by a decreasing horizontal driving force transmitted through the at least one contoured chute and imparted on the portioned pieces.

37. The apparatus of claim 36, wherein the portioned pieces accumulate in a spaced manner proximate to a discharge tip of the contoured chute.

* * * * *